US009500183B2

(12) United States Patent
Markussen (10) Patent No.: US 9,500,183 B2
(45) Date of Patent: Nov. 22, 2016

(54) WIND TURBINE ROTOR SHAFT SUPPORT STRUCTURE (71) Applicant: Vestas Wind Systems A/S, Aarhus N (DK)

(72) Inventor: Erik Markussen, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 553 days.

(21) Appl. No.: 14/023,184

(22) Filed: Sep. 10, 2013

(65) Prior Publication Data
US 2014/0010664 A1  Jan. 9, 2014

Related U.S. Application Data (62) Division of application No. 14/003,650, filed as application No. PCT/DK2012/050071 on Mar. 8, 2012.

(60) Provisional application No. 61/450,151, filed on Mar. 8, 2011, provisional application No. 61/532,595, filed on Sep. 9, 2011.

(51) Int. Cl.
F03D 11/04  (2006.01)

(52) U.S. Cl.
CPC .............. F03D 11/04 (2013.01); F03D 80/70 (2016.05); F03D 80/80 (2016.05);
(Continued)

(58) Field of Classification Search
CPC .. F03D 11/0008; F03D 11/04; F03D 11/045; F03D 11/005; F03D 11/0075; F03D 80/70; F03D 80/80; F03D 80/88; F05B 2240/50; F05B 2240/90; F05B 2240/91; F05B 2240/912; F05B 2240/913
See application file for complete search history.

(56) References Cited

U.S. PATENT DOCUMENTS 6,232,673 B1 * 5/2001 Schoo ................. F03D 1/065
                                                290/1 C
6,879,055 B2 * 4/2005 Becker ................ F03D 1/001
                                                290/44
(Continued)

FOREIGN PATENT DOCUMENTS

DE    102008046210 A1 *  3/2010  ............. F03D 11/00
DE    102008052412 A1    4/2010
(Continued)

OTHER PUBLICATIONS

European Patent Office, Partial European Search Report, issued in corresponding European Application 14165929, dated Jul. 24, 2014, 3 pages.
(Continued)

Primary Examiner — Richard Edgar
Assistant Examiner — Christopher R Legendre
(74) Attorney, Agent, or Firm — Wood Herron & Evans LLP (57) ABSTRACT Support structures of a wind turbine, including a bearing housing that supports bearings that allow a rotor shaft to rotate about a rotor axis. The bearing housing may be constructed to minimize forces in the bearings in response moments that act on the rotor shaft about axes other than the rotor axis. The support structures of the wind turbine may also include a base to which the bearing housing may be mounted. The base may include features that minimize stress within the wind turbine structure and/or a yaw mechanism of the wind turbine in response to moments that act within the wind turbine about axes other than the rotor axis.

9 Claims, 8 Drawing Sheets (52) U.S. Cl.
CPC ..... *F05B 2230/606* (2013.01); *F05B 2240/50* (2013.01); *F05B 2240/90* (2013.01); *F05B 2260/30* (2013.01); *F05B 2260/96* (2013.01); *F05B 2280/5001* (2013.01); *F05B 2280/702* (2013.01); *Y02E 10/722* (2013.01); *Y02P 70/523* (2015.11)

(56) References Cited

U.S. PATENT DOCUMENTS

| | | | | |
|---|---|---|---|---|
| 7,458,776 | B2 * | 12/2008 | LLorente Gonzalez | F03D 7/0204 415/123 |
| 7,922,448 | B2 * | 4/2011 | Garrido | F03D 7/0296 416/1 |
| 8,099,255 | B2 * | 1/2012 | Madge | F03D 7/0224 416/61 |
| 8,434,996 | B2 * | 5/2013 | Bagepalli | F03D 11/0008 415/118 |
| 8,779,619 | B2 * | 7/2014 | Liingaard | F03D 11/0008 290/44 |
| 9,103,326 | B2 * | 8/2015 | Erno | F03D 11/0075 |
| 2010/0074749 | A1 * | 3/2010 | Garrido | F03D 7/0296 416/31 |
| 2011/0138626 | A1 * | 6/2011 | Tirumalai | F03D 1/001 29/889.7 |
| 2011/0243754 | A1 * | 10/2011 | Luneau | F03D 11/0008 416/244 R |
| 2012/0025538 | A1 * | 2/2012 | Luneau | B22C 7/00 290/55 |
| 2012/0224799 | A1 * | 9/2012 | Wagner | F03D 11/0008 384/308 |
| 2013/0302144 | A1 * | 11/2013 | Demtroder | F03D 1/001 415/124.2 |
| 2014/0010664 | A1 * | 1/2014 | Markussen | F03D 11/0008 416/244 R |

FOREIGN PATENT DOCUMENTS

| | | | | |
|---|---|---|---|---|
| DK | WO 9703288 | A1 * | 1/1997 | F03D 11/00 |
| DK | 102009008437 | A1 * | 8/2010 | F03D 11/04 |
| DK | WO 2011051369 | A2 * | 5/2011 | F03D 11/0008 |
| EP | 1045139 | A2 | 10/2000 | |
| EP | 1251306 | A2 | 10/2002 | |
| EP | 1457673 | A1 | 9/2004 | |
| EP | 1571334 | A1 | 9/2005 | |
| ES | EP 2806161 | A1 * | 11/2014 | F03D 11/00 |
| WO | 2010045913 | A2 | 4/2010 | |

OTHER PUBLICATIONS

International Searching Authority, Search Report issued in corresponding International Application No. PCT/DK2012/050071 dated Oct. 19, 2012, 6 pages.

* cited by examiner

WIND TURBINE ROTOR SHAFT SUPPORT STRUCTURE

CROSS REFERENCE TO RELATED APPLICATIONS

This application claims the benefit of co-pending U.S. patent application Ser. No. 14/003,650, filed Sep. 6, 2013, which is a U.S. National Phase Application of International Application No. PCT/DK2012/050071, filed Mar. 8, 2012, which claimed the benefit of U.S. Provisional Application Nos. 61/450,151 filed Mar. 8, 2011 and 61/532,595 filed Sep. 9, 2011, the disclosures of which are incorporated by reference herein in their entirety.

TECHNICAL FIELD

Aspects of the invention relate to structures for supporting a rotor shaft of a wind turbine. More particularly, aspects of the invention relate to a housing that supports one or more bearings that in-turn support the rotor shaft, and/or a structure that supports the bearing housing.

BACKGROUND

Figure 1:
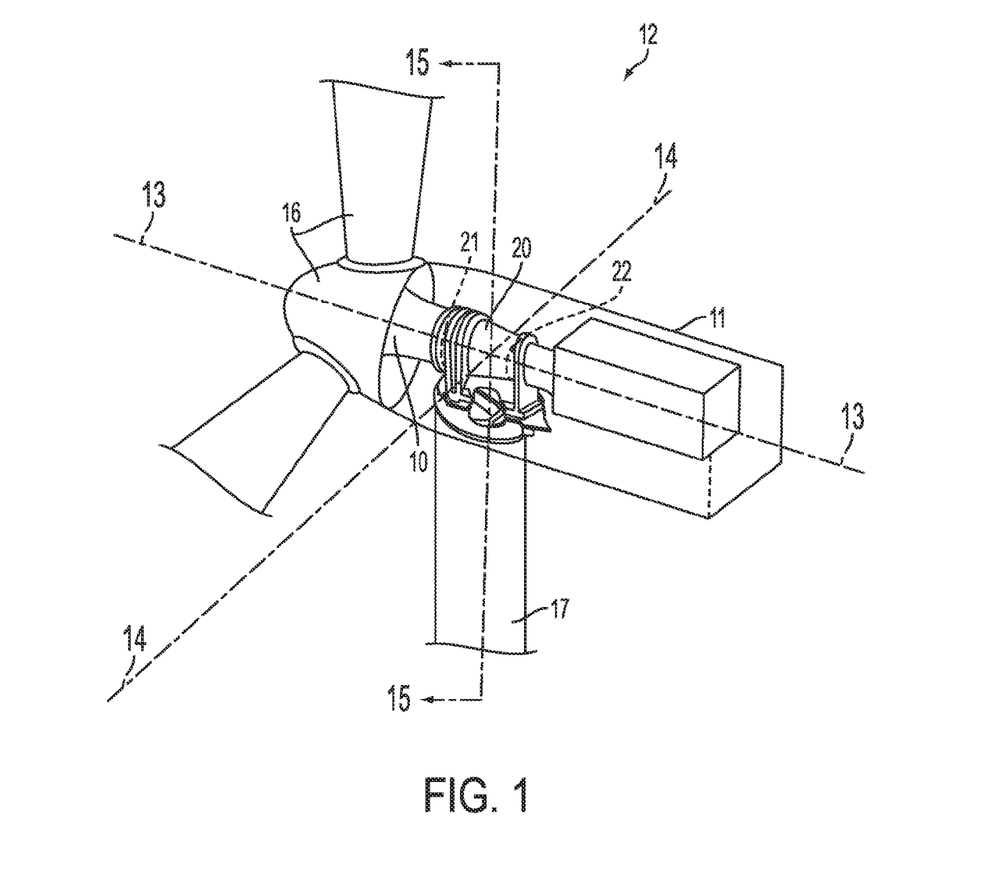
FIG. 1 is a schematic view of a wind turbine, generally showing the positioning of a bearing housing and the axes about which forces and/or moments may act relative to the bearing housing.

Conventional wind turbines include a rotor 16 having two or more blades centrally mounted to a hub, as shown in FIG. 1. A rotor shaft 10 extends from the hub along a rotor axis 13 and is supported by rotor bearings in a bearing housing 20 that located within the nacelle 11 of the wind turbine 12. The bearings allow the rotor 16 to rotate about the rotor axis 13 (also referred to herein as the y-axis) while preventing the rotor from rotating about an axis 15 that lies perpendicular and substantially vertical to the rotor axis (referred to herein as the "z" axis) or an axis 14 that lies perpendicular and horizontal to the rotor axis (referred to herein as the "x" axis). It is to be appreciated that the bearings also prevent the rotor shaft from moving in translation along any direction, other than potentially along the rotor axis 13 by a nominal amount.

In conventional wind turbines, the rotor bearings are mounted within a housing that includes a forward rotor bearing seat and a rearward rotor bearing seat. Generally speaking, the conventional design approach that has been taken has been to provide a very stiff housing construction to prevent any movement or flexure at the bearing seats, and thus within the bearings. The applicant has appreciated, however, that allowing some limited degree of flexibility in areas of the bearing housing may promote increased bearing life.

SUMMARY

Aspects of the present invention relate to support structures of a wind turbine. One such support structure includes a bearing housing that supports bearings which allow a rotor shaft to rotate about a rotor axis. The bearing housing may be constructed to minimize forces in the bearings in response moments that act on the rotor shaft about axes other than the rotor axis. The support structures of the wind turbine may also include a base to which the bearing housing may be mounted. The base may include features that minimize stress within the wind turbine structure and/or a yaw mechanism of the wind turbine in response to moments that act within the wind turbine about axes other than the rotor axis.

According to one aspect, a support structure of a wind turbine includes a housing having a first bearing seat located at a forward portion of the housing and a second bearing seat located rearward of the first bearing seat. The first and second bearing seats receive and support first and second bearings, respectively, that support a rotor shaft in rotation about an axis that extends between forward and rearward portions of the housing. A first pair of lateral supports extend generally downward from lateral sides of the housing and are positioned toward the forward portion of the housing. Each of the first pair of lateral supports defines a mounting foot adapted to mount to a base that is separated from the other mounting foot of the first pair of lateral supports. A structural gap is defined between each of the pair of lateral supports and the first bearing seat.

According to another aspect, a support structure of a wind turbine includes a housing having a first bearing seat located at a forward portion of the housing and a second bearing seat located rearward of the first bearing seat. The first and second bearing seats receive and support first and second bearings, respectively, that support a rotor shaft in rotation about an axis that extends between forward and rearward portions of the housing. A lowermost portion of the first bearing seat has a first stiffness and second portions of the first bearing seat that lie upward and laterally away from the lowermost portion having a second stiffness, less than the first stiffness.

According to another aspect of the invention, a support structure of a wind turbine includes a housing that has a first bearing seat located at a forward portion of the housing and a second bearing seat located rearward of the first bearing seat. The first and second bearing seats receive and support first and second bearings, respectively, that support a rotor shaft in rotation about an axis that extends between forward and rearward portions of the housing. A first stiffening ring extends at least partially about a circumference of the first bearing. A stiffening structure extends at least partially about the housing at a position rearward of the first stiffening ring and forward of the second bearing seat. The first stiffening ring and the stiffening structure defining a gap there between that extends at least partially about a circumference of the housing.

According to another aspect of the invention, a support structure of a wind turbine includes a base that has a mounting for at least a portion of a yaw mechanism that connects the base to a wind turbine tower and that allows rotation of the base about a vertical axis that extends through the wind turbine tower. The base includes an aperture to be positioned over the wind turbine tower. A plurality of mounting platforms on the base receives mounting feet of a bearing housing that supports a rotor shaft. A first strut extends between a first pair of the plurality of mounting platforms and across the aperture. A second strut extends between a second pair of the plurality of mounting platforms and intersects the first strut.

According to another aspect of the invention, a support structure of a wind turbine includes a base that has a mounting for at least a portion of a yaw mechanism that connects the base to a wind turbine tower and that allows rotation of the base about a vertical axis that extends through the wind turbine tower. The base includes an aperture to be positioned over the wind turbine tower. A plurality of mounting platforms on the base receive mounting feet of a bearing housing that supports a rotor shaft in rotation about a rotor axis. A first strut extends through the aperture and between a first lateral portion of the base on a first side of the rotor axis and to a rear portion of the base near the rotor axis.

A second strut extends through the aperture and between a second lateral portion of the base on a second side of the rotor axis, opposite to the first side, and to a rear portion of the base near the rotor axis.

According to yet another aspect of the invention, a support structure of a wind turbine includes a base that has a shape corresponding to a circular cross-section of a top portion of a wind turbine tower. A first plurality of mounting areas on the base receive mounting feet of a bearing housing that supports a rotor shaft in rotation. A second plurality of mounting areas on the base receive a skeleton structure of a nacelle of the wind turbine. The first plurality of mounting areas receive substantially all loads associated with the rotor shaft and the second plurality receive substantially all of loads associated with the skeleton structure.

These and other aspects of the invention will be appreciated from the following description and claims.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labelled in every drawing. In the drawings.

DETAILED DESCRIPTION

A wind turbine rotor shaft 10 may be supported within the nacelle 11 of a wind turbine 12 by two or more rotor bearings 21, 22 spaced along the rotor axis of rotation 13 within a bearing housing 20, as represented schematically in FIG. 1. The bearings 21, 22 allow rotation of the rotor about the rotor axis 13 when the wind drives the rotor 16 of the wind turbine so that power may be transferred downstream to a gearbox and/or other components of the wind turbine drive train. The bearings 21, 22 also resist moments that act about the x-axis 14 and z-axis 15 and forces that act along any of the x-axis, y-axis, and/or z-axis so as to prevent undesirable motion. The applicant has appreciated that the bearing housing may be constructed, according to the various inventive ways described herein, to minimize pressure on the rotor bearings throughout operation, including normal operating modes and operating modes where the rotor experiences bending moments about the z-axis and/or x-axis. This may promote reduced bearing wear and increased bearing life.

According to some aspects of the invention, the bearing housing includes a first bearing seat for a first bearing at a forward end of the housing (referred to interchangeably herein as a "forward bearing seat"). As used herein, the term "forward" refers to a direction along the y-axis that lies upwind when the wind turbine is in position for operation. Lateral supports extend downwardly from lateral sides of the bearing housing, near the forward bearing support (structural area about the first bearing seat), leaving one or more structural gaps positioned between the lateral supports and the area below the first bearing support. The structural gap(s) allows the first bearing seat to flex in regions near the interface with the lateral supports. Flexing in this region may help reduce the overall peak pressures that might otherwise result during normal operation from the stiffness associated with the interface to the lateral supports, helping to extend bearing life.

According some aspects of the invention, the first bearing seat may include a locally stiffened region within the first bearing support, at or near a lower most portion of the seat. As mentioned above, the inclusion of structural gaps near the lateral supports may also allow flexing at the lower most portion of the first bearing seat, where normal operating forces applied by the rotor may typically be the greatest. Stiffening added at the lower most portion of the first bearing support may, however, prevent excessive flexing at this location and promote more consistent pressures on the first bearing throughout rotor shaft/bearing rotation. In this respect, increased stiffness at the lower portion of the first bearing seat may help to extend bearing life.

According to some additional aspects of the invention, the bearing housing may be constructed to allow some flexibility in response to moments that act about the z-axis and/or x-axis. In this respect, the first bearing and a second bearing, located rearward of the first bearing, may remain substantially in line with the portions of the rotor shaft supported by the first and second bearings, respectively. Flexing in this manner may prevent increased pressure that might otherwise occur due to edge loading of the bearings, or other factors. Preventing these increased pressures may help to extend bearing life.

According to some aspects of the invention, the bearing housing may be mounted to a support base at mounting feet that lie below the rotor-axis, below the rotor shaft, or even spaced below the bearing support. Positioning of the mounting feet away from the y-axis may reduce the forces that act at the mounting feet in response to moments about the x-axis. The mounting feet may, additionally or alternatively, extend laterally away from the y-axis to reduce forces that act at the mounting feet in response to moments about the z-axis.

Figure 2:
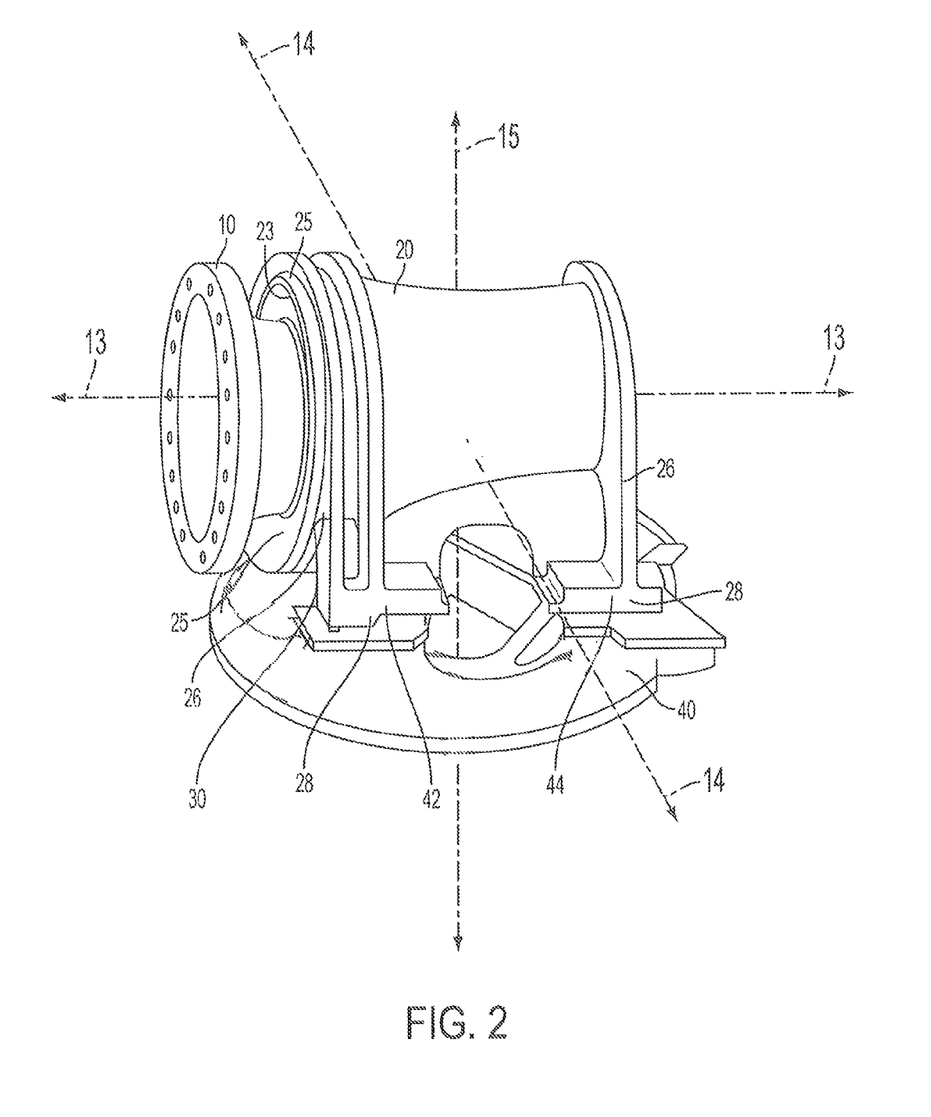
FIG. 2 is a perspective side view of a bearing housing and a base, according to one embodiment.
Figure 3:
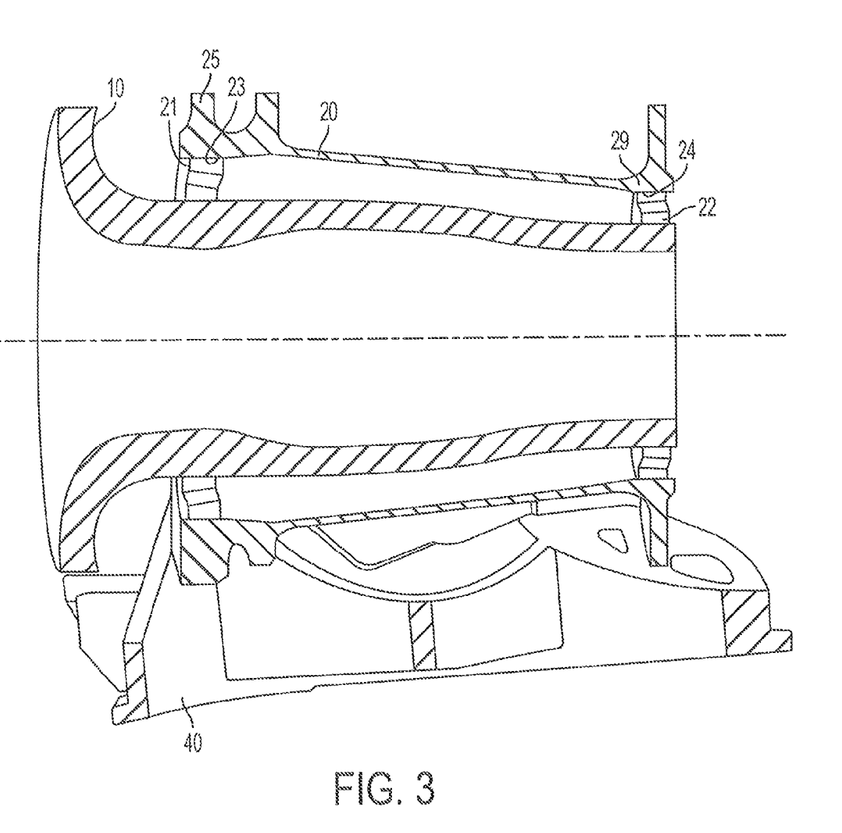
FIG. 3 is a cross-sectional view of the bearing housing and base of FIG. 2, taken along a plane defined by the x-axis and y-axis as shown in FIG. 2.

Turn now to the figures, and initially FIGS. 2 and 3 which show a perspective side view of a bearing housing 20 mounted on a base 40, and a rotor shaft 10 supported by bearings 21, 22 of the housing, and a cross-sectional view thereof. As shown, the bearing housing 20 includes a substantially cylindrical first bearing seat 23 at a forward (rotor side) end of the housing that supports a first bearing 21. The housing 20 also includes a second bearing seat 24 to support a second bearing 22, also substantially cylindrical in shape, and positioned rearward of the first bearing 21. The housing includes first and second bearing supports or support regions 25, 29 that surround each of the first and second bearing seats and that may include thickened structural support, as described herein. Together, the first and second bearings 21, 22 support the rotor shaft 10 in rotation about the y-axis 13. The housing has a cylindrical or even conical shape extending between the first and second bearings 21, 22. Lateral supports 26 extend from lateral sides of the housing, adjacent to the first or second bearing seats, and downward to mounting feet 28. The mounting feet rest on and mount to a base 40 that receives the bearing housing 20.

Under normal operating conditions the weight of the rotor (e.g. the rotor shaft, hub and blades) may create a downward force moment that acts about the x-axis 14, further pulling the forward portion of the rotor shaft 10 downward against the lower portion of the first bearing 21 and first bearing seat 23. Even distribution of this load, which may be the greater loads received by the first bearing 21 during typical operation, may promote increased bearing life. One manner in which this load may be distributed evenly and/or smoothly is shown graphically in FIG. 4 by curve 31, which represents the forces (or average pressure) experienced at one roller of a roller-type bearing, as the roller moves through 360 degrees of rotation around the first bearing 21. Zero (0) degrees/360 degrees is taken as the upper most point of the bearing and 180 degrees the lower most point while 180 degrees and 270 degrees represent the lateral sides of the first bearing. As shown, forces are nominal or even zero as the roller moves through the upper most point, due to the mass of the rotor, positioned forward of the bearing, pulling the rotor shaft downward. The forces increase smoothly to a maximum pressure 27 that is maintained relatively constant as the roller moves through the lower most portions of the bearing, from at least about 150 degrees to 210 degrees. The smoothed force curve 31 of FIG. 3 represents one optimum that embodiments of the housing 20 described herein may achieve.

Figure 4:
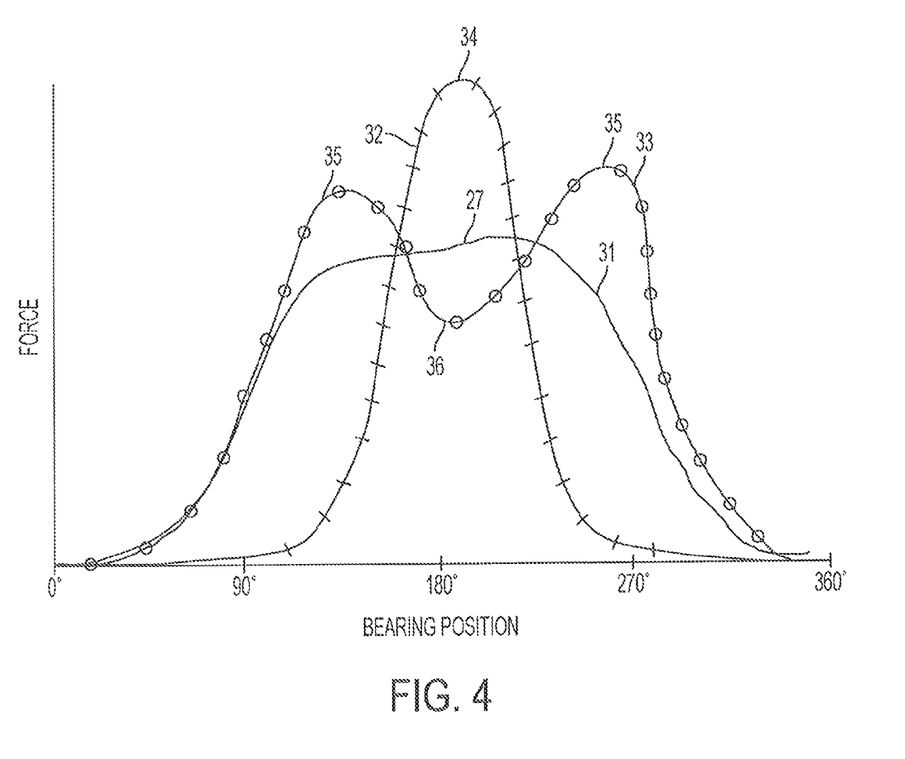
FIG. 4 is a graph of different bearing force curves representative of forces experiences by a roller of a roller-type bearing supported in different types of bearing housings.

FIG. 4 also shows curve 32 and 33 that represents the force (or average pressure) acting on a roller of a roller-type bearing as the roller travels through a complete rotation and where the primary downward load on the first bearing has not been evenly and/or smoothly distributed. Curve 32 shows a high central peak force 34 and represents the force curve that may be associated with a first bearing support in a housing that provides support from below by an overly rigid structure. As shown, this may result in a very high peak force 34 distributed narrowly near the lower most portion of the first bearing and first bearing support. Also shown in FIG. 4 is force curve 33 that may be associated with a housing that provides excess flexibility at the lower most portions of the first bearing/bearing support, at least relative to adjacent portions of the first bearing support. As shown, curve 33 includes local maximum 35 values and a local minimum value 36, which may be associated with poor force distribution, a greater overall maximum force, and sharper force transitions, relative to curve 31.

Figure 5:
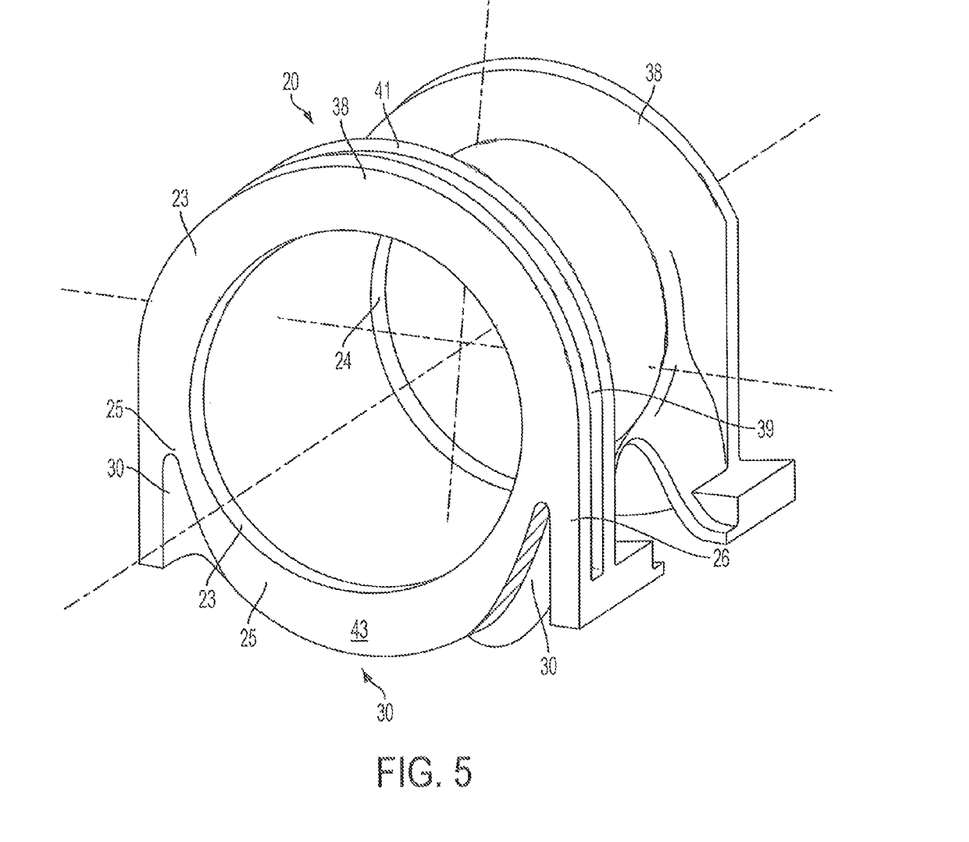
FIG. 5 is perspective view of bearing housing, taken from a upper, forward position of the housing, according to one embodiment.

In addition to having a structure that promote even distribution of the primary, downward force on the first bearing 21, the housing 20 and first bearing support 23 may be constructed to resist forces acting in other directions and/or moments that act about the x-axis or z-axis. For instance, the mounting feet 28 may be positioned to reduce stress at the joint between the mounting feet and the base, as shown in FIG. 5. According to some embodiments, the mounting feet 28 are positioned lower than a centerline 13 of the rotor shaft (coincident with the y-axis) to increases leverage against any moments acting about the x-axis. As is to be appreciated, increasing leverage at a joint against moments may result in reduced forces at the joint. Reduction of forces may help prevent movement and/or other types of undesirable effects, such as fatigue and/or fretting. According to some embodiments, the joint face of the mounting feet 28 of the housing are positioned entirely below the y-axis, or even further. In some embodiments, the joint face of the mounting feet may be positioned entirely below the rotor shaft 10, or even entirely below the first mounting seat 23 of the housing. The joint face of the mounting feet 28 may even be separated by from the lower most portion of the first bearing seat by a non-zero distance, which in some embodiments may be up to 25 cm or greater, 100 cm or greater or even 250 cm or greater.

Joint faces of the mounting feet 28 may additionally be positioned laterally away from the plane in which the y-axis and z-axis lie to provide for improved leverage against moments acting about the z-axis, as is also shown in FIG. 5. Positioning of the mounting feet in this manner may provide increased leverage and thus reduced forces at the mounting feet, for similar reasons described above with respect to positioning of the mounting feet below the y-axis. According to some embodiments, portions of the mounting feet 28 extend laterally outside of a projection of the first bearing, as viewed from above along the z-axis. According to other embodiments, the mounting feet 28 lie entirely outside of the projection. In other embodiments, the mounting feet may even be spaced laterally away from the projection of the rotor shaft. It is to be appreciated that the term "mounting feet" as used herein, refers to the interface portions of the bearing housing that contact and through which all or a substantial portion of the support are provided to the housing by the base.

The mounting feet 28 may be positioned, as described above, by lateral supports 26 that extend from the bearing housing 20 downward and/or laterally away from the y-axis, as shown in FIG. 5. Lateral supports that extend from lateral portions of the first bearing support may help provide a more direct force path between mounting feet below the y-axis in response to forces acting parallel to the x-axis and/or to moments acting about the z-axis. Such a construction may also help stiffen the first bearing seat 23 in a manner that promotes a widening of the bearing force curve (see FIG. 4) helping to better distribute forces across a wider portion of the first bearing 21. It is to be appreciated that increased stiffness at lateral portions of the first bearing support may be associated with structures other than the lateral supports that position the mounting feet 28. For example, according to some embodiments, the structure of the first bearing support itself may have an increased thickness to provide such stiffness.

Connecting to the base through lateral portions of the first bearing support may also provide for a reduction in the overall force in the first bearing. Lateral supports 26 may allow the lower most portion of the first bearing support to flex downwardly to a greater degree, at least with respect to a bearing that is supported by directly below by a column that extends to the base. The lateral supports 26 provide for stiffness at interface points with the first bearing seat 23, which may help to widen and reduce the maximum forces that might otherwise be present about the lower most portion of the bearing force curve.

According to some embodiments, the lateral supports 26 may also provide for the inclusion of structural gaps or gussets 30 positioned between the lateral supports 26 and the lower most portions of the first bearing support 25, as shown in FIG. 5. These gaps or gussets 30 may promote flexibility in in the lower portions of the first bearing seat 21, leading to a reduction in the maximum bearing force value. In the embodiment of FIG. 5, the structural gaps or gussets 30 are defined by actual gaps or spaces between lateral supports and other portions of the bearing housing 20 or the base 40. It is to be appreciated that structural gaps, as that term is used herein, may also refer to portions of the bearing housing that are relatively flexible, as compared to adjacent portions of the bearing housing. By way of example, in FIG. 5 the structural gaps are associated with a reduced radial thickness of the first bearing support 25, and such a reduced thickness may be achieved in other embodiments without actually providing a space between the lateral supports and first bearing seat.

The first bearing support 25 may include features that provide increased rigidity at or below the lower portion of the first bearing seat 23. As is to be appreciated, the lower portions of the first bearing and first bearing seat may be in direct line with the primary force associated with the downward weight of the hub and blades. As discussed herein, some degree of flexibility at or near the lower portions of the first bearing seat 21, as provided by structural gaps or gussets, may be desirable to provide for a reduction in the maximum bearing force and/or a widening of the force curve. Too much flexibility directly at the lower most portion may, however, result in a local force minimum associated with an uneven force distribution, as shown in curve 33 of FIG. 3. According to some embodiments, the housing may include increased stiffness at or near the lower portions of the first bearing support 25 to prevent a local minimum from occurring.

The lower portions of the first bearing support 25 may be stiffened in different ways. As shown in the embodiment of FIG. 5, the lower portions 25 include a thickened lip 43 of material. The lip extends from about 150 degrees to about 210 degrees, although other spans are also possible and are contemplated. The lip 43 has increased thicknesses both in the radial direction (away from the y-axis) and in the axial direction (parallel to the y-axis) relative to other portions of the first bearing seat 21. The lip is illustrated as being cast integral with the first bearing seat portion of the housing, but according to other embodiments, may be formed separately and attached thereto.

As discussed herein, various embodiments of the bearing housing 20 may include a second bearing seat 24 for a second bearing (equivalently referred to herein as a rearward bearing), positioned rearward along the y-axis of the first bearing. Generally speaking, loads carried by the first bearing may be greater than those carried by the second bearing, due to the first bearing receiving the bulk of downward forces associated with the hub and blades being cantilevered forward of the bearing housing. As such, the second bearing may be of a smaller diameter than the first bearing, although other configurations are also possible. Regardless, it is to be appreciated that any of the features described herein with respect to the first bearing seat may also be applicable to and utilized in various embodiments of the rear bearing seat, and that these features are described herein with respect to the first bearing and first bearing seat merely for the sake of convenience.

The bearing housing may have a cylindrical or conical structure that extends between the first and second bearing seats 21, 22 and that accommodates the rotor shaft positioned there through, as shown generally in the figures. Structurally connecting the first and second bearing seats to one another, in this respect, may strengthen the overall structure of the housing, particularly in bending modes. It is to be appreciated that not all embodiments of housings may include a cylindrical or conical structure that connects the first and second bearing seats, and that, according to some embodiments the first and second bearing seats may be formed in separate structures and/or in structures that are connected to one another in other ways.

Embodiments of the bearing housing 20 may include features that prevent edge loading of the first and/or second bearings, in response to moments that act about the x-axis or z-axis. As is to be appreciated, the rotor shaft may bend, even if slightly, in response to bending moments. This bending may result in increased loads at the first or second bearings, and/or corresponding portions of the rotor shaft 10 as shown in exaggerated form FIG. 6, where bending of the rotor shaft results in increased pressure where bearing supports and bearings not able to move with the rotor shaft, as represented in the cross-hatched areas 45 of FIG. 6. The structure of the housing may include features that allow some degree of flexibility of the overall first and second bearing seats, relative to one another, to prevent such edge loading.

Figure 6:
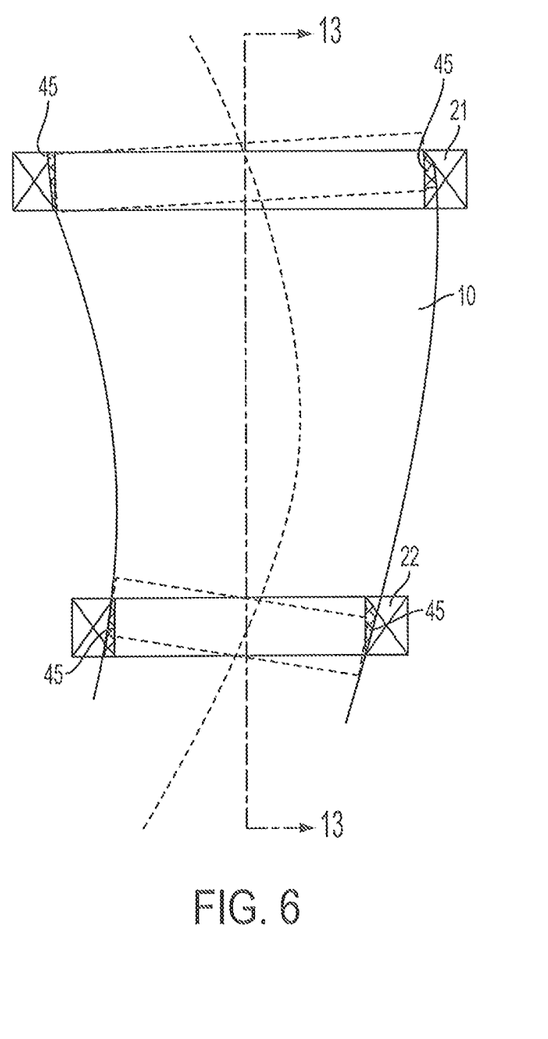
FIG. 6 is a schematic view showing, in an exaggerated manner, bending that may occur in a rotor shaft.

The first bearing seat 21, as shown in FIG. 5, is positioned forward relative to the associated mounting feet 28 at the forward end of the housing. This relative positioning may also be seen in FIG. 7, which provides a slightly offset, underside view of the bearing housing 20. Positioning the first bearing seat 23 forward may promote flexibility of the overall first bearing seat 23 in bending, relative to the second bearing seat 24. This may effectively act to support the first bearing seat in a cantilevered manner relative to the mounting feet, so that the first bearing seat may flex/rotate about z-axis or x-axis, relative to the second bearing seat, allowing the rotor shaft and bearing seats to move together, as shown in FIG. 6. According to some embodiments, this may be accomplished by positioning of the first bearing seat 23 in line with a forward edge 37 of the mounting feet 28. Other configurations may also accomplish similar effects, including embodiments where the first bearing seat is positioned at a position that extends either partially or wholly forward of the forward edge of the mounting feet. According to other embodiments, the first bearing support may simply be positioned above the forward most half of the mounting feet, or even in other manners.

The first bearing seat and/or second bearing seat may include structures that provide rigidity to the bearing seat, with minimal impact on flexibility of adjacent portions of the housing 20. As may be seen in FIGS. 2, 3, 5, and 7, the first and second bearing seats 23, 24 are surrounded by bearing supports that include a stiffening ring 38 that is coextensive in the y-direction with the corresponding bearing seat. This may provide rigidity to the support the substantially circular shape of the bearing, while allowing some flexing of the bearing as a whole, relatively rigid circular shape, to accommodate some bending of the rotor shaft. As shown in FIGS. 2, 3, 5 and 7, an additional stiffening ring 41 may be positioned rearward of the stiffening ring that lies about the first bearing seat to help stiffen the housing while still allowing the first bearing seat to flex as a whole structure in response to bending. A gusset or flex region 39 is created between the stiffening ring 38 associated with the first bearing seat and the additional stiffening ring 41.

Mounting feet 28 that are separated from one another may, additionally or alternatively, allow for some flexibility in bending between the first and second bearing seats 23, 24. As shown in the FIGS. 5 and 7, the first bearing seat 21 is supported most directly by a first pair 42 of mounting feet 28 that lie toward the forward end of the housing 20, and that are separated from a second pair 44 of mounting feet 28 that lie toward the rear end of the housing 40, near the second bearing seat 24. Mounting feet 28 of each of the first and second pair 42, 44 are also separated from one another laterally (in the x-direction) lying on opposite lateral sides of the bearing housing. This separation of the mounting feet can help allow the first bearing seat to move as a unit, supported by the stiffening rings, relative to the second bearing seat to prevent edge loading.

As illustrated schematically in FIG. 1, the bearing housing may be incorporated into a wind turbine 12, positioned over the wind turbine tower 17. Moving the rotor 10 of a wind turbine closer to the tower 17 may reduce overall bending loads on the tower 17 due to a reduction in the lever arm associated with the downward weight of the rotor. To this end, placement of the bearing housing 20 over the tower 17 may facilitate positioning of the rotor 10 closer to the tower 17 to help reduce bending loads. In such an arrangement, the bearing housing 20 may be constructed to allow the passage of equipment and/or personnel from inside the top of the tower 17 to the interior of the nacelle 11. In the illustrated embodiment, passage may be made between the mounting feet 28 that lie beneath the first and second bearing seats and the base 40, as shown in FIG. 2, although other constructions are also possible.

Figure 8:
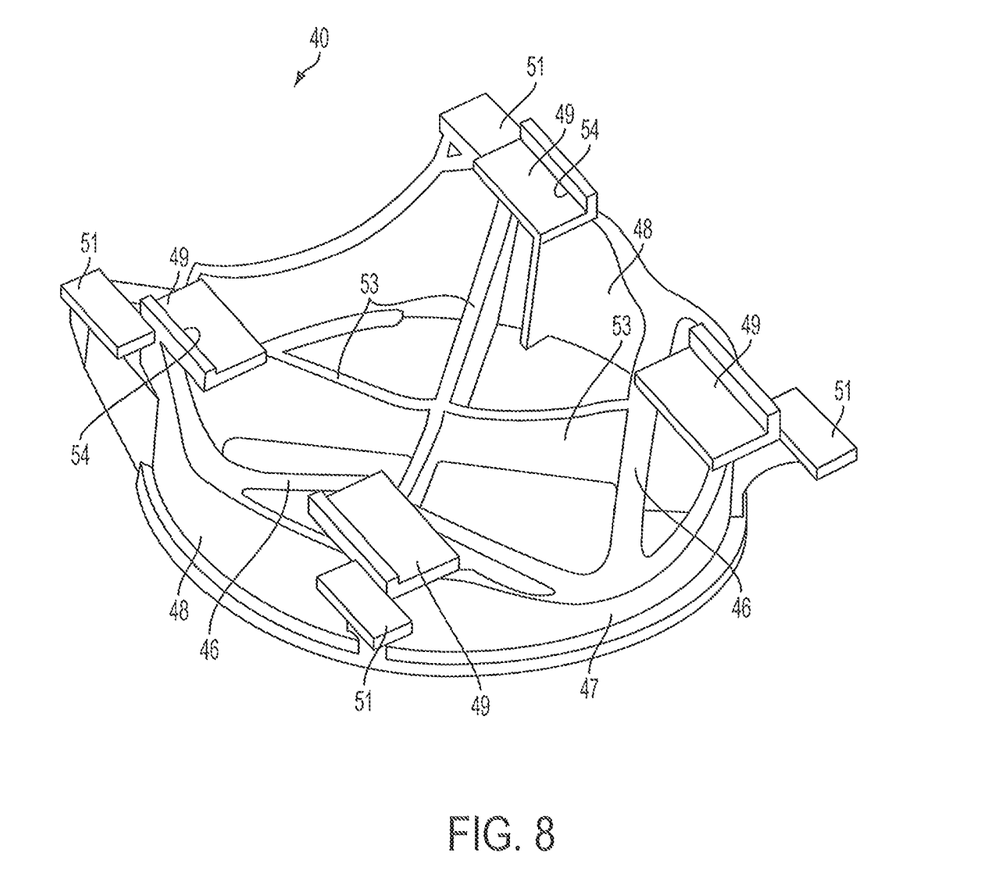
FIG. 8 is a perspective view of a base, according to one embodiment, taken from a rearward and lateral point of view.

The base 40, as illustrated in the embodiment shown in FIG. 8, may be shaped and/or sized consistent with the top of the wind turbine tower 17, including features for mounting the base 40 and any components supported therein (e.g., the overall nacelle structure) to the tower 17. For example, a mounting for a yaw mechanism may be positioned at a lower end of the base 40. The lower end may receive the upper portions of a yaw bearing or other components of a yaw mechanism, including features that may be used to clamp the upper and lower portions of the yaw mechanism together.

As discussed herein, one of the larger loads transferred to the tower from the nacelle is the bending load associated with the downward weight of the rotor 10, acting some distance forward of the tower 17. The thickened struts 46 that extend from lateral portions of the base to a rearward portion 47 of the base, forming a "V" shape, help distribute loads received at the rear portion about the periphery of the base 40 in response to these bending loads. For instance, the weight of the rotor may, under circumstances, pulls the forward portion of the base downward and tilt the rearward portion of the base upward. This upward tilting of the rearward portion 47 may stress clamping mechanisms that hold an upper portion of a yaw bearing associated with the nacelle to a lower portion of the yaw bearing associated with the tower. The struts 46 that lie directly between the rearward portion 47 and lateral portions 48 may help distribute loads associated with the upward tilting of the rear portion of the base, thus alleviating stress on the highest loaded clamping mechanisms.

The base 40 may be configured to receive all loads from the nacelle and rotor of the wind turbine, and to pass these loads on to the tower. That is, according to some embodiments, any mechanical loads associated with the rotor that are not passed onto to a gearbox and/or alternator, may be passed to the base 40 through mounting pedestals 49 that receive mounting feet 28 of the bearing housing. The base may additionally include separate mounting pedestals 51, as shown in FIG. 8, to support the structure of the nacelle, including the nacelle skeleton structure (not shown) and any components supported by the nacelle skeleton and/or a front plate of the nacelle (not shown). According to some embodiments, the base may act as the primary or even the only structural connection between the nacelle skeleton and the drivetrain components of the wind turbine (i.e., rotor, bearing housing, gearbox, alternator). Providing separate paths to the base for loads associated with the drivetrain and the nacelle skeleton may minimize noise and/or vibration in the nacelle skeleton that might otherwise result from a direct connection to the drivetrain.

Figure 7:
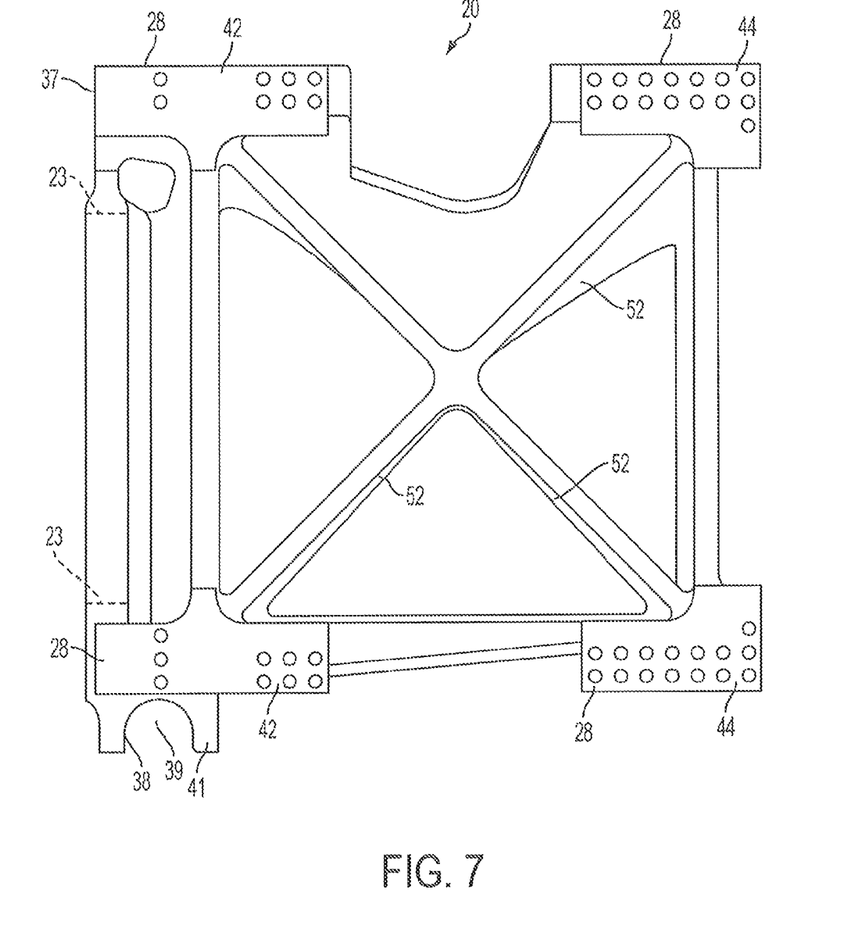
FIG. 7 is perspective view of the underside of a bearing housing, according to one embodiment, taken from an offset point below of the housing.

Features may be incorporated into the base 40 and/or the bearing housing 20 that prevent movement at joints between the mounting feet 28 and mounting pedestals 49, while also allowing some of the housing 20 flexibility described herein and/or providing a passageway from the tower to the nacelle interior. As shown in FIG. 7 struts 52 may extend between each of the mounting feet of the bearing housing 20 to provide direct lines of support therebetween. Struts 53 may, additionally or alternatively, extend between each of the mounting pedestals 49 of the base 40 to provide direct lines of support. The struts 52, 53 may be directly incorporated into a cast structure of the bearing housing 20 or base 40, or attached thereto after these components are formed. The struts include an "X" shaped configuration that provides a direct line between diagonally opposed mounting feet 28 of the housing, and a similar "X" shaped configuration in the base 40. Each of the X-shaped struts of the base and housing are separated from one another so as to provide a passageway therethrough for personnel and/or equipment. Connections between adjacent corners of the mounting feet in the housing may be provided by the stiffening rings described herein and lateral walls of the housing itself. In the base, the circular frame may provide a line of support between adjacent mounting platforms of the base, although other configurations are also possible.

The mounting feet 28 may be fastened to the base 40 with different types of connections. As illustrated, the mounting feet may include through holes to allow for the passage of threaded fasteners that are received by the support frame. The mounting feet may include positive stop 54 features to prevent relative motion between the bearing housing and base in particular directions. As shown in FIG. 8 the base includes positive stops 54 that protrude upwardly to abut side surfaces of the mounting feet, when the housing is mounted thereto. The positive stops contact the mounting feet to resist motion/forces that act along the x-axis or in rotation about the z-axis. Other types of protrusions or engagements may alternatively be used to provide a positive stop feature, as aspects of the invention are not limited to that which is shown.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A wind turbine, comprising:
a tower;
a nacelle positioned adjacent a top of the tower, the nacelle having a nacelle skeleton structure;
a rotor having a central hub and two or more blades extending therefrom;
a rotor shaft extending from the hub and into the nacelle;
a bearing housing positioned in the nacelle and including one or more bearings for supporting the rotor shaft, the bearing housing further including a plurality of mounting feet; and
a support structure coupled to a top portion of the tower for supporting the rotor shaft and nacelle, the support structure comprising:
a base that has a shape corresponding to a circular cross-section of the top portion of the tower;
a first plurality of mounting areas on the base adapted to receive the mounting feet of the bearing housing that supports the rotor shaft, the first plurality of mounting areas receiving substantially all loads associated with the rotor shaft; and
a second plurality of mounting areas on the base adapted to receive the skeleton structure of the nacelle of the wind turbine, the second plurality of mounting areas receiving substantially all loads associated with the nacelle skeleton structure.

2. The wind turbine of claim 1, wherein
the base includes a mounting for at least a portion of a yaw mechanism that connects the base to the wind turbine tower and that allows rotation of the base about a vertical axis that extends through the wind turbine tower, and wherein the base includes an aperture adapted to be positioned over the wind turbine tower, the wind turbine further comprising;
a first strut that extends between a first pair of the first plurality of mounting areas and across the aperture; and
a second strut that extends between a second pair of the first plurality of mounting areas and that intersects the first strut.

3. The wind turbine of claim 2, wherein the mounting for the yaw mechanism includes a flange at a lower end of the base.

4. The wind turbine of claim 1,
wherein the second plurality of mounting areas is laterally outboard of the first plurality of mounting areas.

5. The wind turbine of claim 2, wherein the first and second struts are positioned below the first plurality of mounting areas.

6. A support structure of a wind turbine, comprising:
a base that includes a mounting for at least a portion of a yaw mechanism that connects the base to a wind turbine tower and that allows rotation of the base about a vertical axis that extends through the wind turbine tower, the base including an aperture adapted to be positioned over the wind turbine tower;
a plurality of mounting platforms on the base adapted to receive mounting feet of a bearing housing that supports a rotor shaft in rotation about a rotor axis;
a first strut that extends through the aperture and between a first lateral portion of the base on a first side of the rotor axis and to a rear portion of the base near the rotor axis; and
a second strut that extends through the aperture and between a second lateral portion of the base on a second side of the rotor axis, opposite to the first side, and to a rear portion of the base near the rotor axis.

7. The support structure of claim 6, wherein the first strut and second strut form a V-shape when viewed along the vertical axis.

8. The support structure of claim 6, wherein the base is circular in shape.

9. The support structure of claim 6, wherein the mounting for the yaw mechanism includes a flange at a lower end of the base.

* * * * *